Aug. 23, 1927.

H. PETERMAN 1,640,156

SUGAR BOWL

Filed Dec. 28, 1926

Inventor
Henry Peterman

By Herbert E. Smith

Attorney

Patented Aug. 23, 1927.

1,640,156

UNITED STATES PATENT OFFICE.

HENRY PETERMAN, OF WALLACE, IDAHO, ASSIGNOR OF ONE-THIRD TO CHARLES STATLER AND ONE-THIRD TO OLGARD JOHNSON, BOTH OF WALLACE, IDAHO.

SUGAR BOWL.

Application filed December 28, 1926. Serial No. 157,437.

My present invention relates to improvements in sugar bowls of the dispensing type, wherein means are provided for controlling the discharge of sugar from the bowl, to insure economy and prevent waste of the sugar. While this table or kitchen article of my invention is adapted for use in containing and dispensing various kinds of fluent material, the container is especially designed for use as a sugar bowl in restaurants, dining rooms, boarding houses and other public eating places.

The primary object of my invention is the provision of means within the bowl, whereby when the latter is tipped forward a predetermined quantity of sugar may be discharged from a trap chamber, and as the bowl is tipped back to normal position the trap chamber is again filled with sugar for a succeeding discharge if and when necessary or desirable.

My invention consists in certain novel combinations and arrangements of parts as will hereinafter be more fully set forth and claimed.

In the accompanying drawings I have illustrated one complete example of the physical embodiment of my invention wherein the parts are combined and arranged according to the best mode I have thus far devised for the practical application of the principles of my invention.

Figures 1, 2, 3:
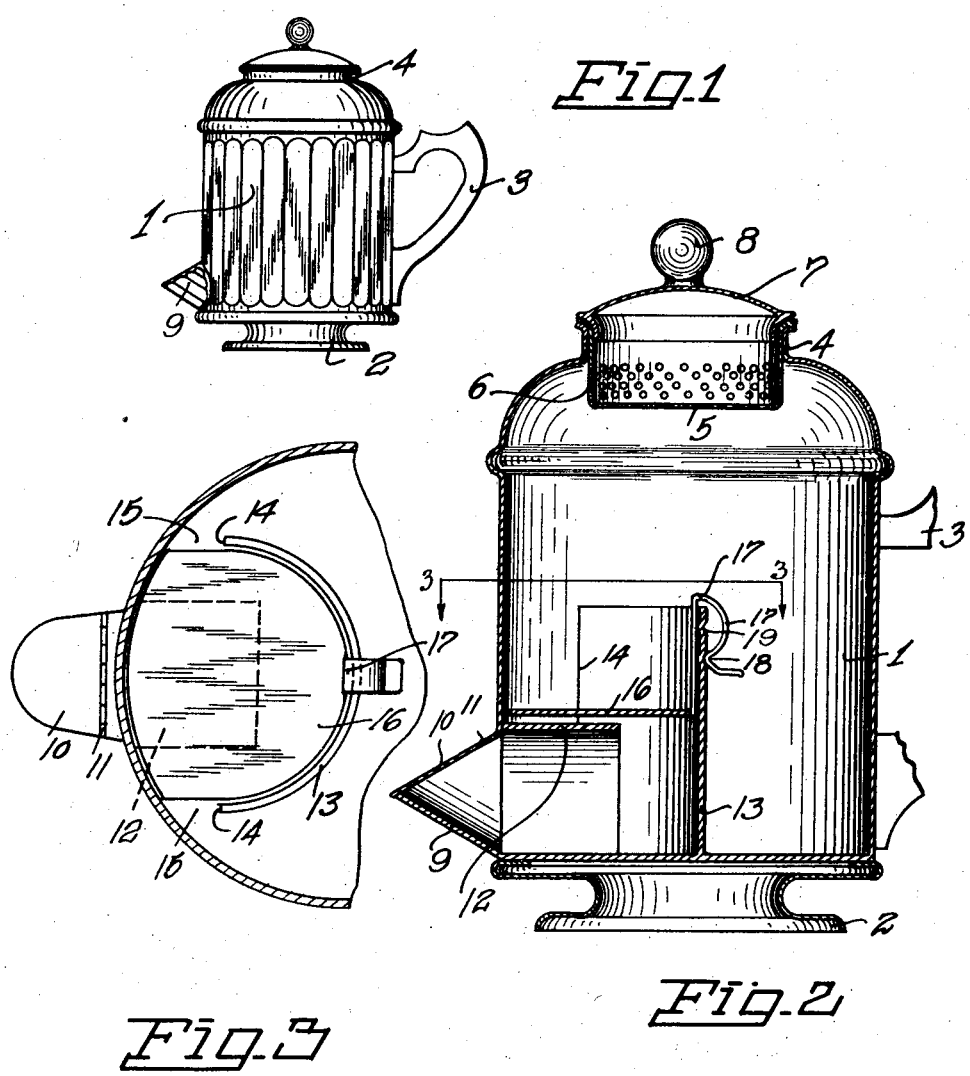
Figure 1 is a view in side elevation of a dispensing article for kitchen or table use and embodying my invention.
Figure 2 is an enlarged vertical sectional view of the sugar bowl.
Figure 3 is a horizontal sectional view at line 3—3 of Figure 2 showing the means for controlling and guiding discharge of the sugar from the bowl to the spout.

In the preferred form of my invention as shown in Figure 1 I utilize a cylindrical bowl 1 of suitable material, size and shape, and the bowl is ornamented as desired. The usual base 2 is provided, and the bowl may be manipulated by grasping the handle 3. The restricted, open top is fashioned as a neck 4, and within this neck portion the sifter or cup 5 is supported, said cup having a perforated bottom and side walls as indicated at 6. This sifter or cup is removable for cleansing, as is also the lid 7 which is provided with a knob or handle 8. When the lid is removed, the sugar may be supplied to the bowl through the removable sieve or sifter 5 to prevent foreign or extraneous matters being passed to the interior of the bowl.

A pouring or discharge spout 9 is provided at the front and adjacent to the bottom of the bowl, and this spout is provided with a lid 10 which is hinged at 11 to swing open when the bowl is tipped forward. Just within the spout opening of the bowl an interior, horizontally arranged nozzle 12 is fixed to the bottom of the bowl to form a trap chamber and to guide the sugar to the spout when it is to be dispensed. This nozzle forming the trap chamber is open at its rear or inner end and open at its front end to the spout. Back of the inner or rear open end of the trap chamber, and spaced slightly therefrom is a curved, vertical, baffle wall or partition 13, the edges 14 of which project beyond the inner open end of the trap chamber as indicated in Figures 2 and 3. This arrangement of the trap chamber and the forwardly extending edges of the barrier or baffle plate provides for entrances 15 and 15 at opposite sides of the rear opening of the trap chamber. Thus, when the bowl is tipped forward the sugar is permitted to flow through the entrances 15, then when the bowl is tipped backwardly this sugar falls within the curved partition or baffle plate, and then is trapped in the nozzle 12 or trap chamber, from which it is poured through the spout when the bowl is turned to discharge, or tipped to pour the sugar from the trap chamber. By successive manipulations of the bowl the sugar, in restricted quantities is thus supplied to the trap chamber and then poured therefrom through the spout.

Above the trap chamber is provided an adjustable gate 16, having a bent handle 17 adapted to be suspended over the top edge of the baffle wall or partition, and formed with a spring detent 18 for co-action with depressions or notches 19 in the rear face of the baffle wall or plate. This horizontally disposed gate closes the space between the rear open end of the trap chamber and the concave face of the baffle wall, and also covers the trap chamber and the spaces at its sides that form the entrances 15. The gate at its rear edge conforms to the concave face of the baffle wall and at its front edge conforms to the inner face of the bowl, and it may be elevated, and retained in elevated position by co-action of the spring detent and a selected notch, to increase the space between the front edges of the baffle plate and the inner face of the bowl, and thus permit increased flow of the sugar through these entrances to the trap chamber. This increased flow to the trap chamber provides for the discharge of an increased quantity of sugar through the trap chamber and spout, thus predetermining quite accurately the quantity of sugar to be dispensed.

Having thus fully described my invention, what I claim as new and desire to secure by Letters Patent is—

1. The combination with a sugar-bowl having a pouring spout at its bottom and an interior, open end trap chamber communicating with the spout, of an upright partition spaced from the rear or inner open end of the chamber, and an adjustable, horizontal gate co-acting with said partition, above the chamber.

2. The combination with a sugar bowl having a pouring spout and an interior open end trap chamber at the bottom of the bowl and communicating with the spout, of a baffle wall spaced from the open inner end of the chamber with its front edges projecting beyond said end to form entrances for sugar, and an adjustable, horizontal gate co-acting with the baffle wall above said chamber.

3. The combination in a sugar bowl with a spout, an interior open end trap chamber and a curved baffle wall having its edges projecting beyond the inner open end of the chamber, of a vertically adjustable, horizontal gate covering said trap chamber and located between the baffle wall and the wall of the bowl, a bent handle on the gate, and a spring detent on said handle for co-action with selected depressions in the outer face of said wall.

In testimony whereof I affix my signature.

HENRY PETERMAN.